(12) United States Patent
Gross

(10) Patent No.: US 12,524,572 B2
(45) Date of Patent: Jan. 13, 2026

(54) SYSTEMS AND METHODS FOR DATA ACCESS MANAGEMENT

(71) Applicant: Susan Joy Gross, Bronx, NY (US)

(72) Inventor: Susan Joy Gross, Bronx, NY (US)

(73) Assignee: Alderbrook Inc., Bronx, NY (US)

( * ) Notice: Subject to any disclaimer, the term of this patent is extended or adjusted under 35 U.S.C. 154(b) by 0 days.

(21) Appl. No.: 19/068,612

(22) Filed: Mar. 3, 2025

(65) Prior Publication Data

US 2025/0278514 A1    Sep. 4, 2025

Related U.S. Application Data

(60) Provisional application No. 63/560,912, filed on Mar. 4, 2024.

(51) Int. Cl.
| | |
|---|---|
| *G06F 21/60* | (2013.01) |
| *G06F 21/31* | (2013.01) |
| *G06F 21/62* | (2013.01) |
| *G16H 10/60* | (2018.01) |
| *H04L 9/32* | (2006.01) |

(52) U.S. Cl.
CPC .......... *G06F 21/6245* (2013.01); *G06F 21/31* (2013.01); *G16H 10/60* (2018.01); *H04L 9/3213* (2013.01); *G06F 2221/2141* (2013.01)

(58) Field of Classification Search
CPC ................. G06F 21/6245; G06F 21/31; G06F 2221/2141; G16H 10/60; H04L 9/3213
See application file for complete search history.

(56) References Cited

U.S. PATENT DOCUMENTS

2022/0358240 A1* 11/2022 Neal .................... G06F 21/6245
2023/0222137 A1*  7/2023 Aucinas ................. G06F 21/44
                                                              707/802

\* cited by examiner

*Primary Examiner* — David J Pearson
*Assistant Examiner* — Nega Woldemariam
(74) *Attorney, Agent, or Firm* — Foley & Lardner LLP

(57) ABSTRACT

Aspects of the technical solutions described herein relates to a system for data access management. A system receives, responsive to an interaction with an information resource of a provider portal, a request to access data. The system authenticates the user. The system provides, to a data source, a request to grant, to the system, access to user data of the user stored at one or more data sources. The system receives an access token to allow the system to retrieve user data from the data sources. The system transmits a request to access the user data using the access token assigned to the system. The system receives the user data responsive to transmitting the request to access the user data. The system transmits, responsive to a request from the partner, a portion of the user data based on values corresponding to a type of data obtained at registration of the provider portal.

20 Claims, 10 Drawing Sheets

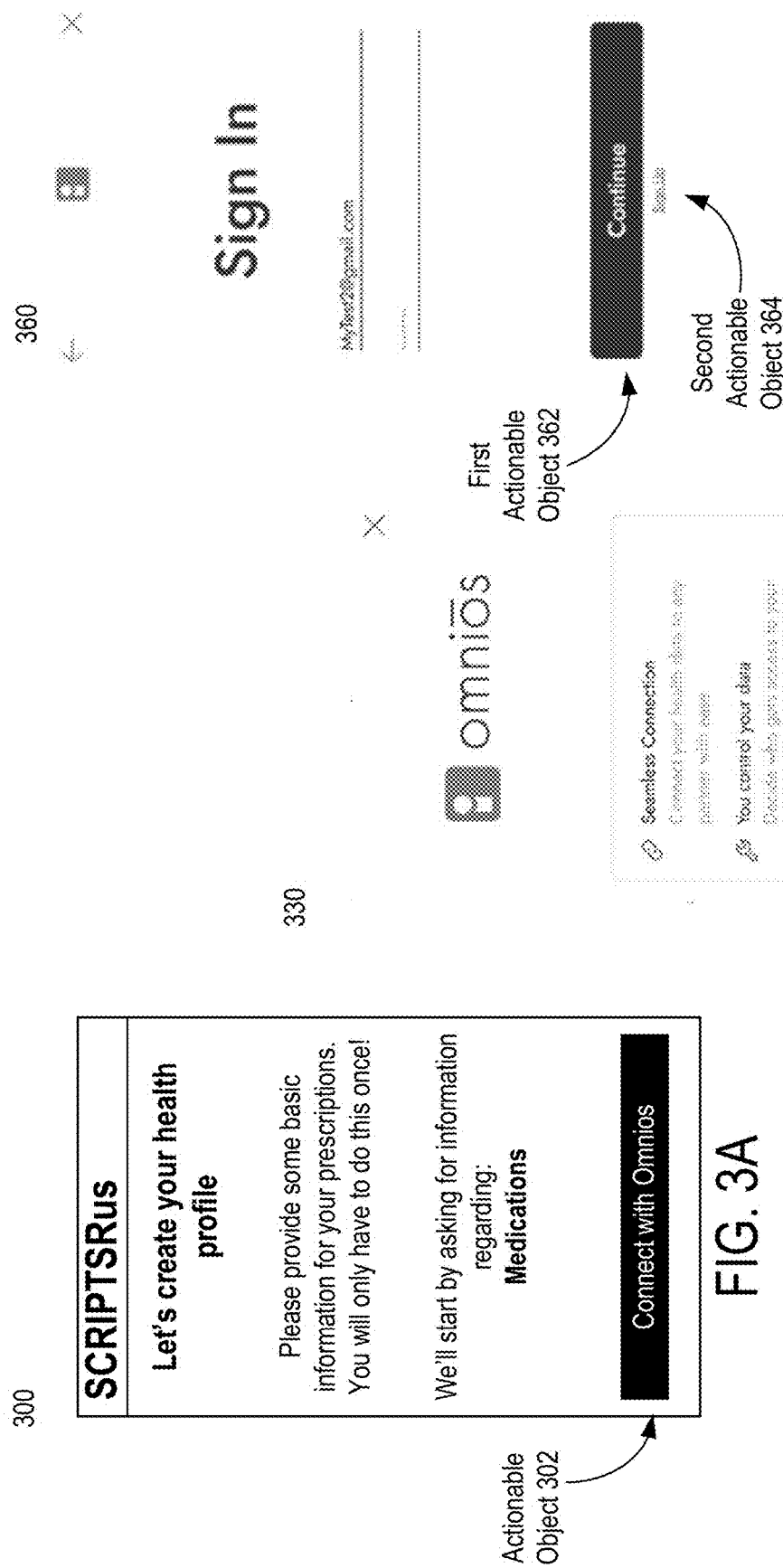
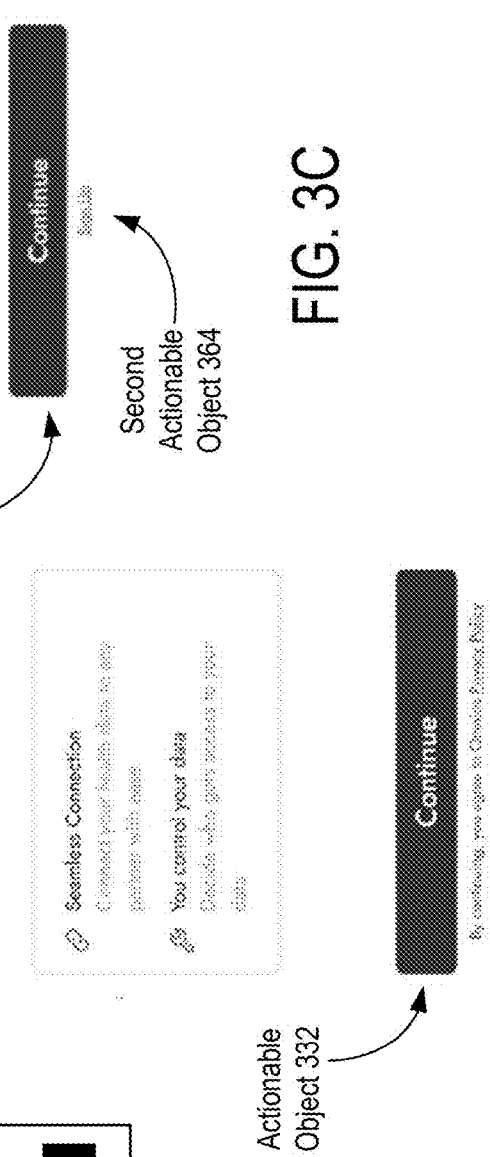
FIG. 3A
FIG. 3B
FIG. 3C

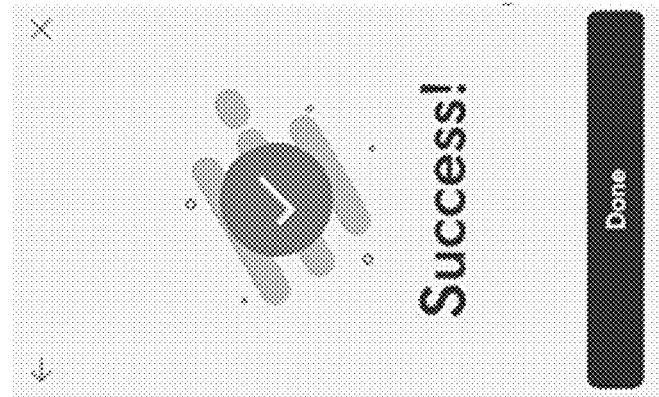
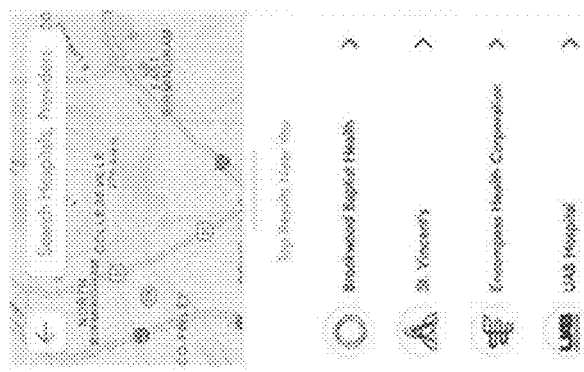
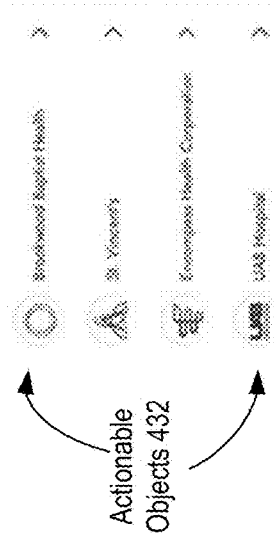
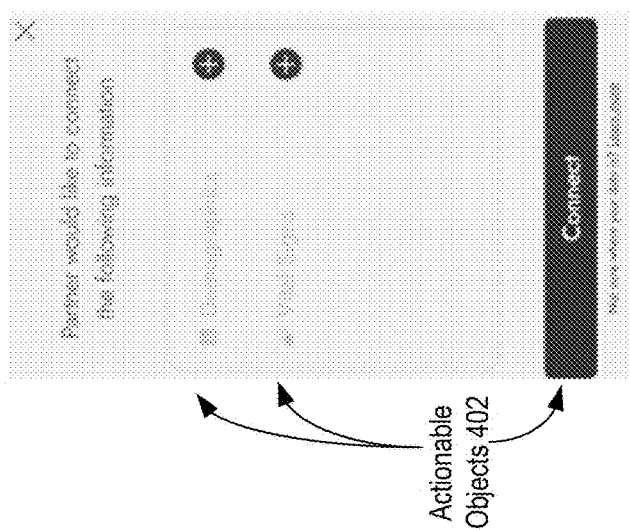
FIG. 4C
FIG. 4B
FIG. 4A

| User ID 502A | Healthcare 504A | Healthcare 504B | Healthcare 504C | Healthcare 504D |
|---|---|---|---|---|
| | FHIR Data 136A <br> Scopes 506A-D <br> Partner 508T <br> Partner 508F | FHIR Data 136A <br> Scopes 506A-D <br> Partner 508A <br> Partner 508G | FHIR Data 136A <br> Scopes 506A-D <br> Partner 508P <br> Partner 508A | FHIR Data 136A <br> Scopes 506A-D <br> Partner 508L <br> Partner 508F |
| User ID 502B | FHIR Data 136B <br> Scopes 506J-L <br> Partner 508C <br> Partner 508B | FHIR Data 136B <br> Scopes 506J-L <br> Partner 508E <br> Partner 508B | FHIR Data 136B <br> Scopes 506J-L <br> Partner 508D <br> Partner 508Q | FHIR Data 136B <br> Scopes 506J-L <br> Partner 508J <br> Partner 508C |

FIG. 5

SYSTEMS AND METHODS FOR DATA ACCESS MANAGEMENT

CROSS-REFERENCE TO RELATED PATENT APPLICATIONS

The present application claims the benefit of and priority to U.S. Provisional Application No. 63/560,912 filed on Mar. 4, 2024, the disclosure of which is incorporated herein by reference in its entirety.

BACKGROUND

The present disclosure relates generally to the field of data access and data management, specifically data access between different data sources including information about users across each data source.

SUMMARY

Aspects of the present disclosure relates to a system that includes one or more processors of a data management system coupled to memory. The one or more processors of the data management system may receive, responsive to an interaction with an actionable object presented within an information resource of a provider portal at a client device of a user, a request to access data. In some embodiments, the one or more processors may authenticate, responsive to receiving authentication credentials from the client device, the user of the client device. In some embodiments, the one or more processors may provide, to a data source, a request to grant, to the data management system, access to user data of the user stored at one or more data sources, the request including a client identifier identifying the data management system. In some embodiments, the one or more processors may receive, responsive to the request to grant, an access token to allow the data management system to retrieve user data of the user from the one or more data sources. In some embodiments, the one or more processors may transmit, via one or more application programming interfaces (API) of the one or more data sources, a request to access the user data of the user using the access token assigned to the data management system. In some embodiments, the one or more processors may receive the user data via the one or more APIs responsive to transmitting the request to access the user data. In some embodiments, the one or more processors may store the user data in one or more data structures managed by the data management system. In some embodiments, the one or more processors may transmit, responsive to a request from one or more servers of the provider portal, a portion of the user data of the user to the one or more servers of the provider portal based on one or more values corresponding to a type of data obtained at registration of the provider portal with the data management system.

In some embodiments, the one or more processors may receive, responsive to a second interaction with a second actionable object presented within a second information resource of a second provider portal at the client device of the user, a request to access data. In some embodiments, the one or more processors may authenticate, responsive to receiving authentication credentials from the client device, the user of the client device. In some embodiments, the one or more processors may provide, to a second data source, a second request to grant, to the data management system, access to user data of the user stored at the second data source, the request including the client identifier identifying the data management system. In some embodiments, the one or more processors may receive, responsive to the second request to grant, a second access token to allow the data management system to retrieve user data of the user from the one or more data sources. In some embodiments, the one or more processors may transmit, via one or more application programming interfaces (API) of the one or more data sources, a second request to access the user data of the user using the second access token assigned to the data management system. In some embodiments, the one or more processors may receive the user data via the one or more APIs responsive to transmitting the second request to access the user data. In some embodiments, the one or more processors may store the user data in one or more data structures managed by the data management system. In some embodiments, the one or more processors may transmit, responsive to a second request from one or more servers of the second provider portal, a second portion of the user data of the user to the one or more servers of the second provider portal based on one or more values corresponding to a type of data obtained at registration of the second provider portal with the data management system.

Aspects of the present disclosure relates to a computer implemented method. The method may include receiving, by one or more processors, responsive to an interaction with an actionable object presented within an information resource of a provider portal at a client device of a user, a request to access data. In some embodiments, the method may include authenticating, by the one or more processors, responsive to receiving authentication credentials from the client device, the user of the client device. In some embodiments, the method may include providing, by the one or more processors, to a data source, a request to grant, to the data management system, access to user data of the user stored at one or more data sources, the request including a client identifier identifying the data management system. In some embodiments, the method may include receiving, by the one or more processors, responsive to the request to grant, an access token to allow the data management system to retrieve user data of the user from the one or more data sources.

In some embodiments, the method may include transmitting, by the one or more processors, via one or more application programming interfaces (API) of the one or more data sources, a request to access the user data of the user using the access token assigned to the data management system. In some embodiments, the method may include receiving, by the one or more processors, the user data via the one or more APIs responsive to transmitting the request to access the user data. In some embodiments, the method may include storing, by the one or more processors, the user data in one or more data structures managed by the data management system. In some embodiments, the method may include transmitting, by the one or more processors, responsive to a request from one or more servers of the provider portal, a portion of the user data of the user to the one or more servers of the provider portal based on one or more values corresponding to a type of data obtained at registration of the provider portal with the data management system.

In some embodiments, the method may include receiving, by one or more processors, responsive to a second interaction with a second actionable object presented within a second information resource of a second provider portal at the client device of the user, a second request to access data. In some embodiments, the method may include authenticating, by the one or more processors, responsive to receiving authentication credentials from the client device, the user of the client device. In some embodiments, the method may include providing, by the one or more processors, to a second data source, a second request to grant, to the data management system, access to user data of the user stored at a second data source, the request including the client identifier identifying the data management system. In some embodiments, the method may include receiving, by the one or more processors, responsive to the second request to grant, a second access token to allow the data management system to retrieve user data of the user from the one or more data sources.

In some embodiments, the method may include transmitting, by the one or more processors, via one or more application programming interfaces (API) of the one or more data sources, a second request to access the user data of the user using the second access token assigned to the data management system. In some embodiments, the method may include receiving, by the one or more processors, the user data via the one or more APIs responsive to transmitting the second request to access the user data. In some embodiments, the method may include storing, by the one or more processors, the user data in one or more data structures managed by the data management system. In some embodiments, the method may include transmitting, by the one or more processors, responsive to a second request from one or more servers of the second provider portal, a second portion of the user data of the user to the one or more servers of the second provider portal based on one or more values corresponding to a type of data obtained at registration of the second provider portal with the data management system.

BRIEF DESCRIPTION OF THE DRAWINGS

FIGS. 3A-3C depict a user interface of a user device running on an application, in accordance with an embodiment;

FIGS. 4A-4C depict another user interface on the application of the client device, in accordance with an embodiment;

FIG. 5 depicts a data structure of an electronic health record, in accordance with an embodiment;

DETAILED DESCRIPTION

Figure 1:
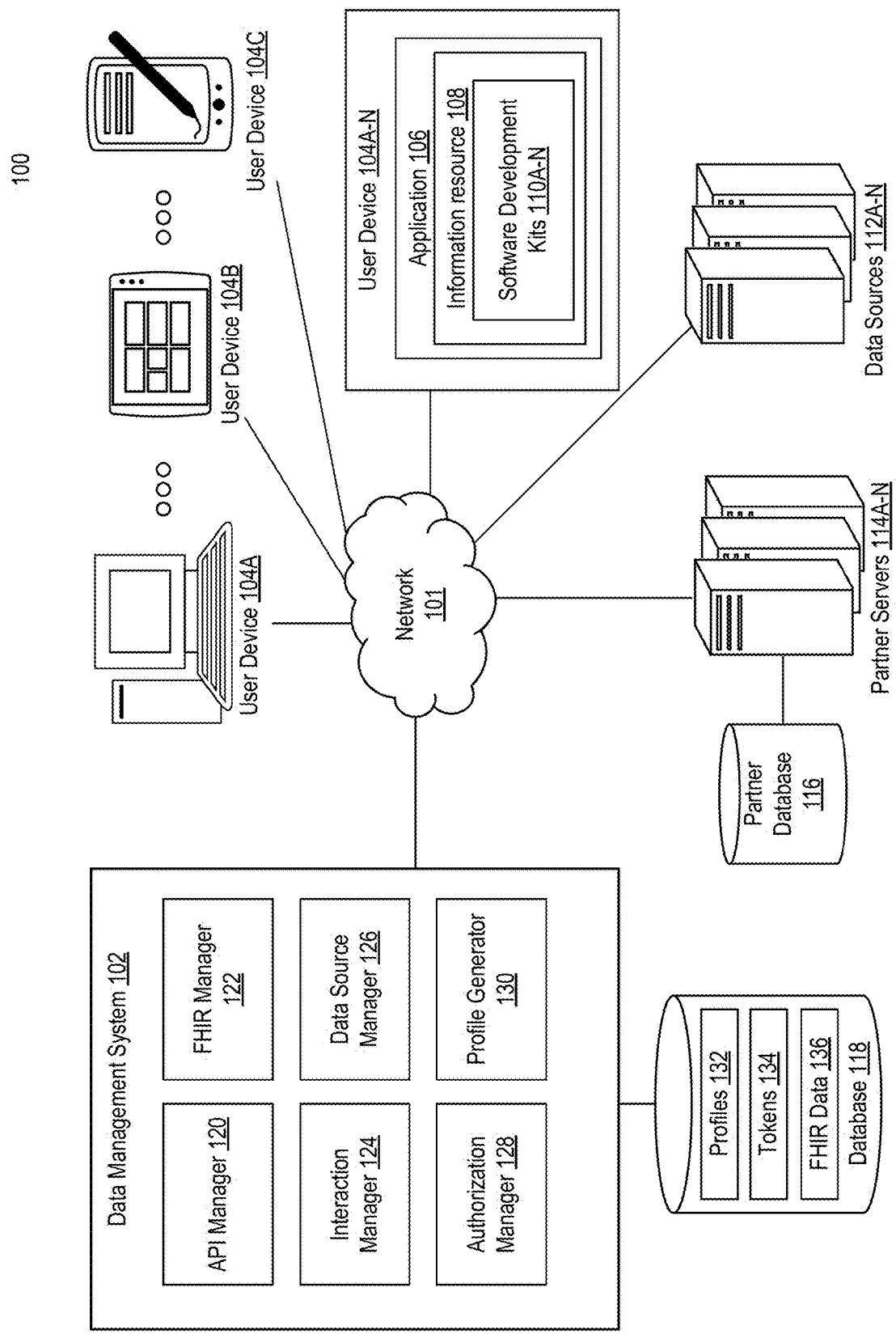
FIG. 1 depicts a block diagram of a system for secure access to data, in accordance with an embodiment.

Today, many users and patients need to use multiple software applications to view their healthcare data. This can be cumbersome and inefficient, as it requires navigating through different interfaces and systems. Additionally, users face challenges in selectively sharing their healthcare information with specific organizations. This selective sharing allows for the user to retain control and for maintaining privacy and ensuring that only relevant information is shared with authorized entities. Existing technological solutions that allow for data sharing across organizations fail to provide a robust system through which data stored in one or more databases can be selectively shared based on the organization and/or the user's permissions. As a result, existing technological solutions are at risk of data leakage and fail to provide adequate privacy controls when transmitting data to other systems.

The technical solutions described herein overcomes these technical challenges by establishing limits on the types of data that can be shared with provider portals based on limits at registration and relying on access token management to provide fine-grained access control to users. The system includes an authorization server, allowing users to provide fine-grain access control of their healthcare information to organizations that request it. This ensures that users can selectively share their data with authorized entities while maintaining privacy. In addition, the system also uses an access token mechanism to authenticate users and grant access to their data. The authentication code is passed back to the server in exchange for an access token, which allows the user to retrieve and share their data with partners, prior to the expiration of the access token. This access token mechanism ensures secure and controlled access to user data, addressing the challenges of data sharing and privacy. Overall, the technical solutions described herein can provide a robust and efficient solution for managing and sharing healthcare information, reducing data leakage, and improving privacy of sensitive information that conventional systems often struggle to provide.

The technical solutions described herein addresses technical challenges by setting predefined limits on the types of data that can be shared with provider portals during registration and utilizing access token management for fine-grained user access control. The system features an authorization server that enables users to grant precise access control over their healthcare information to requesting organizations, ensuring selective data sharing while maintaining privacy. Additionally, the system employs an access token mechanism to authenticate users and grant data access. The authentication code is exchanged for an access token, allowing users to retrieve and share their data securely with partners. This access token mechanism ensures secure and controlled data access, effectively addressing data sharing and privacy challenges. The technical solution described herein can efficiently manage and share healthcare information, overcoming the technical limitations of previous systems.

Referring now to FIG. 1, FIG. 1 depicts a block diagram of a system 100 for secure data access management. In an overview, the system 100 may include at least one data management system 102, a set of user devices 104A-N (hereinafter generally referred to as "user devices 104" or as a "user device 104"), data sources 112A-N (hereinafter generally referred to as "data sources 112" or as a "data source 112"), and partner servers 114A-N (hereinafter generally referred to as "partner servers 114" or as a "partner server 114"), communicably coupled to at least one partner database 116. The various components of the system 100 are communicably coupled over at least one network 101. At least one user device 104 may include at least one application 106. The application 106 may provide at least one information resource 108 using one or more software development kits 110A-N (hereinafter referred to as "SDKs 110" or as an "SDK 110").

The application 106 can be a browser. In some embodiments, the application 106 can be a mobile application. In some embodiments, the application be an application provided by a partner of the data management system.

The one or more networks 101 include any hardware and software capable of conducting communication between the data management system 102 and one or more user devices 104, and one or more databases 118. The network 101 may include hardware and software, internal or external to a computing infrastructure, which may include any number of public networks and/or private computing networks through which the user devices 104 communicates with the data management system 102, the data sources 112, and the partner server 114. The components of the network 101 may host or conduct inter-device communications in accordance with various communication protocols, but not limited to, Transmission Control Protocol and Internet Protocol (TCP/IP), User Datagram Protocol (UDP), and IEEE communication protocols. Non-limiting examples of the network(s) 105 include, but are not limited to, Local Area Network (LAN), Wireless Local Area Network (WLAN), Metropolitan Area Network (MAN), Wide Area Network (WAN), and the Internet.

The data management system 102 may include at least one API manager 120, Fast Healthcare Interoperability Resources (FHIR) manager 122, interaction manager 124, data source manager 126, authorization manager 128, and a profile generator 130. The data management system 102 may have access to at least one database 118.

The database 118 may store, maintain, or otherwise include one or more user profiles 132A-N (hereinafter generally referred to as profiles 132), one or more tokens 134, and FHIR data 136, among others. The functionality of an application 106 may be performed in part on the data management system 102.

In further detail, the data management system 102 may (sometimes herein generally referred to as a computing system or a server) be any computing device comprising one or more processors coupled with memory and software and capable of performing the various processes and tasks described herein. The data management system 102 may be in communication with the one or more user devices 104 and the database 118 via the network 101. The data management system 102 may be situated, located, or otherwise associated with at least one server group. The server group may correspond to a data center, a branch office, or a site at which one or more servers corresponding to the data management system 102 is situated.

Figure 2:
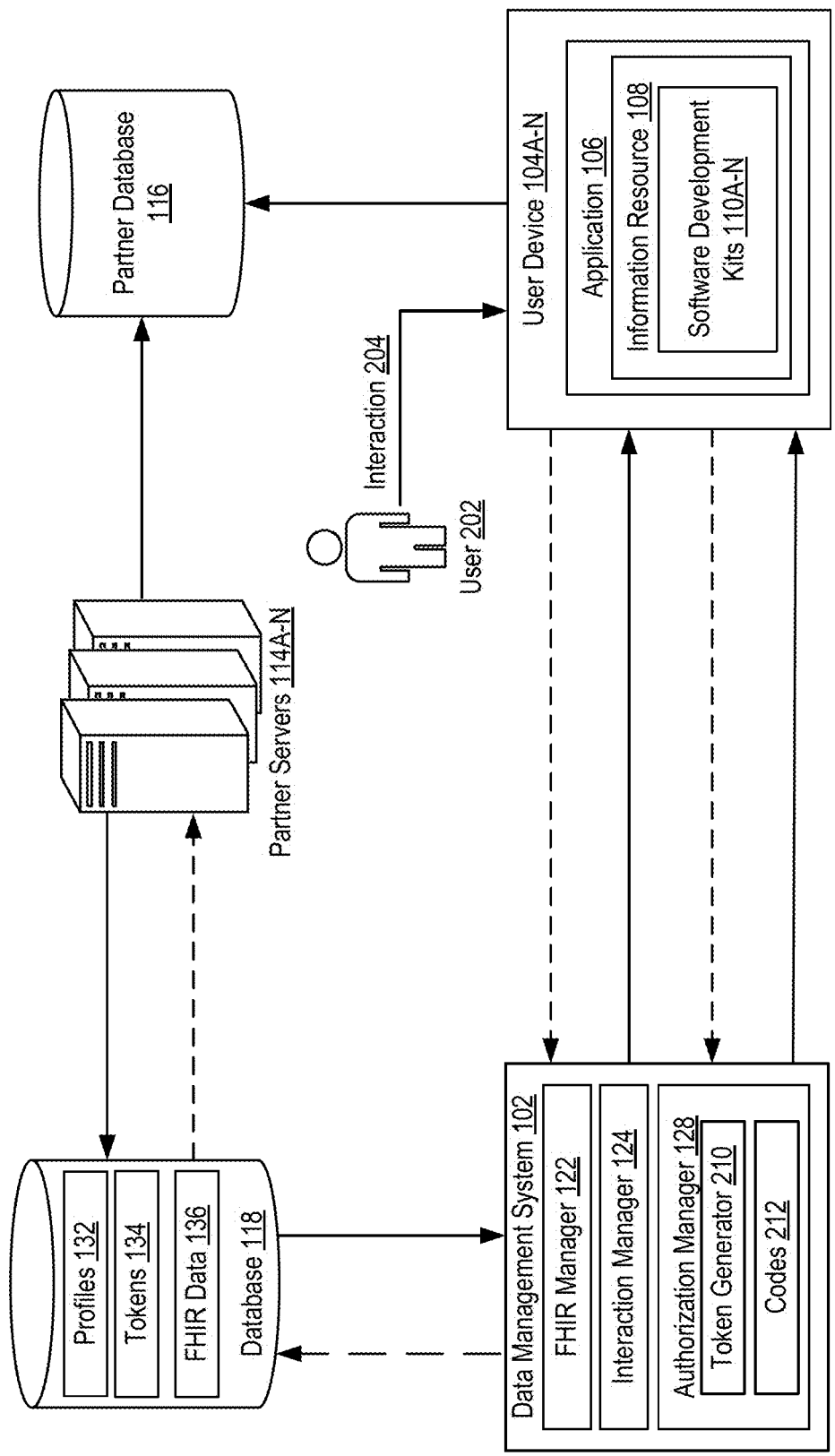
FIG. 2 depicts a block diagram of an interaction system for secure access to the data to a partner server, in accordance with an embodiment.

Referring now to FIG. 1 and FIG. 2, FIG. 2 depicts a block diagram of an interaction system 200 for secure access to the data to a partner server 114. A user 202 may initiate an interaction 204 with the user device 104. The user device 104 can execute, monitor, or run the application 106 and provide at least one information resource 208 executing an SDK 110 that is provided by one or more servers associated with the data management system. The SDK 110 can be a script, code, or other executable code that can be inserted into an information resource to enable a user interacting with the information resource to login and interact with the data management system.

The interaction 204 may include a keypress, a touch on a user interface, a login, a button click, or any other event associated with the presentation of an actionable object (e.g., button, checkbox, etc.) within the information resource 108 as shown in FIG. 2. In some embodiments, the actionable object can be provided via the SDK. The actionable object, when interacted with, can cause the SDK executing within the information resource to provide one or more user interfaces shown in FIGS. 3A-3C.

FIGS. 3A-3C depict a user interface 300 of the user device 104 running the application 106. The user interface 300 includes the actionable object 302 within the information resource 208. The information resource 208 is provided by a server corresponding to a provider portal. For example, the actionable object 302 may be a button to connect the partner server 114 with the data management system 102. In response to the user 202 interacting with the actionable object 302, the actionable object 302 may trigger or cause the SDK 110 to provide the user interface as shown in FIGS. 4A-4C.

FIG. 3B depicts a user interface 330 within the application 106. The SDK 110 may generate, create, or trigger the user interface 330 within the application 106. The user interface 330 may include one or more actionable objects 332 which trigger an SDK 110. The user interface 330 is presented in response to interacting with the actionable object 302 presented on the user interface 300.

The user interface 360 may prompt the user 202 to log in to the application 106 using a username and password. The username may be an identifier for the user 202 such as, an electronic mail address, a form of the user's first and last name, or unique ID generated by the data management system 102. If the user 202 does not have a profile 132 within the database, the user interface 360 may prompt a new user 202 to interact with a second actionable object 364. The second actionable object 364 may prompt the new user 202 to generate or create the username and password and insert information associated with the new user 202. For example, when the new user 202 interacts with the second actionable object 364, the user interface 360 may prompt the new user 202 to generate the username (i.e., test1@gmail.com) and the password (i.e., test123456). During a registration process of a new user of the data management system 102, the user 202 may input their first name, last name, date of birth, medical insurance, social security number, electronic mail address, medical history, current medications, hospitals, providers, among others.

A profile generator 130 of the data management system 102 may generate, create, or determine a profile 132 suitable for the new user 202. The profile 132 may include the username, password, and information associated with the new user 202. For example, the profile generator 130 may use the username, password, date of birth, and insurance of the new user 202 to generate the profile 132 for the new user 202. The profile generator 130 may store the profile 132 in the database 118. The profile 132 may include an association to tokens 134 and FHIR data 136. The tokens 134 correspond to a number of access tokens 134 which correspond to the one or more data sources 112. For example, the profile 132 may include an access token 134 to access a data source 112A during a first time period and a second time period. The access token 134 may allow the user 202 to access the respective data source 112A. To improve security, the token 134 may be restricted to the respective data source 112 to prevent the user 202 from accessing the wrong data source 112.

Referring back to FIG. 3C, once the user 202 interacts with a first actionable object 362 within the application 106, the user device 104 may transmit or send the login credentials to the authorization manager 128 via the user interface 360 that is provided by the SDK 110. The authorization manager 128 can verify the login credentials of the user 202 by fetching or retrieving the profile 132 associated with the user 202 from the database 118. For example, after the user 202 interacts with the second actionable object 364, the authorization manager 128 may compare the username and password of the user interface 360 with the username and password of the profile 132 of the user 202. Upon a successful match, the authorization manager 128 can trigger or cause the user device to present user interface 400 as shown in FIG. 4A. The authorization manager 128 can be a separate authorization server with which the data management system communicates. In some embodiments, the authorization server can support the OAuth2.1 standard.

FIG. 4A depicts the user interface 400 within the application 106 with one or more actionable objects 402. The user interface 400 can indicate, identify, or display one or more aspects of the FHIR data 136 (e.g., medical record, family medical history, demographics, vital signs, among others) that the provider portal is seeking to access from the user's FHIR data. The one or more aspects of the FHIR data 136, also known as scopes, define the type of FHIR data that the provider portal is seeking access to. The type of FHIR data can include demographic information, medical conditions, medications, medical records, medical history, immunization records, practitioners (e.g., physicians, doctors, nurses), clinical notes, among other aspects of FHIR data.

The scopes of the FHIR data that the provider portal is seeking to access from users' FHIR data is based on a partner registration process. The partner registration process entails the partner registering with the data management system in accordance with the user. During the registration process, the partner submits one or more scopes of the FHIR data that the partner would be allowed to access. For example, the partner can submit that the one or more scopes include at least immunization records and family medical history. In another example, the partner can submit that the one or more scopes include medical allergies, demographics, vital signs, and past hospital visits. In this manner, the partner can have fine-grained access to portions of FHIR data associated with the user. Upon registration, the data management system 102 can store, in a data structure, permissions granted to the partner based on the scopes, as will be discussed in FIG. 5.

Referring back to FIG. 4A, the user 202 may submit a request to enable the partner to access medical history, medical records, allergies, family history, demographics, and vital signs and other types of FHIR data 136. In response to a user selecting the actionable object 402 to allow the partner to connect with the electronic health records of the user, the user device presents a second user interface 430 that provides one or more hospitals or other electronic health record data sources for selection. Responsive to a user interacting with the user interface 430, the user provides consent to enable the data management system to obtain access to the selected electronic heath records.

Within the FHIR data 136 to transmit the FHIR data 136 to the partner server 114. The user 202 may execute the interaction 204 with the one or more actionable objects 402 to access the FHIR data 136 associated with the one or more data sources 112. For example, the user 202 can interact with the actionable object 402 to browse a list of hospitals, clinics, service providers, or physicians associated with one or more data sources 112 as shown in FIG. 4B.

FIG. 4B depicts a user interface 430 with a list of data sources 112 within the application 106. In response to the user 202 interacting with the actionable object 402, a SDK 110 can generate, create, or display the user interface 405 and one or more actionable objects 432. Each actionable object 432 in the actionable objects 432 can interact, identity, access, or connect with the respective data source 112. For example, a first actionable object 432 can connect the partner sever 114 with the data source 112B. In another example, a second actionable object 432 can connect the partner sever 114 with the data source 112C. In yet another example, a third actionable object 432 can connect the partner sever 114 with the data source 112D. Upon the selection of one of the actionable objects 432, the data source manager 126 can connect or access the respective data source 112 to retrieve the FHIR data 136 corresponding to the actionable object 402. The data source manager 126 can transmit a signal to the SDK 110 to generate a success indication as shown in the user interface 460 in FIG. 4C.

Referring again to FIG. 1 and FIG. 2, the data management system 102 may receive a request to access data. The request to access FHIR data may be received from a user device. A user of the user device may access a provider portal via an application executing on the user device and select an actionable object on an information resource of the provider portal. In some embodiments, the provider portal can be a website or a mobile application of the partner and the information resource can be a page on the website or the mobile application. The user device 104 may generate the request to access the data based on a user performing an action on the corresponding information resource 108. The information resource 108 may include an actionable object that is presented on the information resource via an SDK or other script. The SDK or script can be provided by or made available by or on behalf of the data management system and may be used to be included in the website or the mobile application of the partner. The SDK or script can be configured such that an actionable object is provided on the information resource, such that when a user performs an action (e.g., click, tap), on the actionable object, the request to access data is generated. The data to be accessed can a subsequent page or additional content. For example, the user 202 execute an interaction 204 with the information resource 108 of the application 106. The SDK 110 may include the actionable object and detects the interaction 204 with the actionable object. The SDK 110 can generate the request to access the data 136 associated with the actionable object and transmit the request to the data management system 102.

Responsive to receiving the request to access data via the actionable object, the data management system or one or more servers can transmit additional information resources for presentation on the user device. The one or more additional information resources can include fields via which the user can provide authentication credentials corresponding to the data management system to authenticate the user. The authentication credentials may include at least one of the username and the password, biometric data, security tokens, smart cards, Personal Identification Number (PIN), Digital Signatures, Biographic information, among others. The data management system 102 can receive the authentication credentials from the user device 104. For example, the user device 104 may transmit the authorization credentials to the data management system 102. In some embodiments, the user device 104 can provide the authentication credentials within the request to access the data. For example, the SDK 110 of the information resource may store the authorization credentials as metadata within the request. In this manner, the data management system 102 can extract the metadata from the request and extricate the authorization credentials.

The interaction manager 124 of the data management system can receive the request from the user device 104 and examine the request and determine the information resource 108 associated with the actionable object. For example, the interaction manager 124 can receive the request from the user device 104 and determine that the information resource 108 corresponds to the partner from the request. Furthermore, the interaction manager 124 and application programming interface (API) manager 120 can provide the application 106 with one or more user interface elements to induce an interaction 204 based on the previous interactions 204 of the user 202. For example, the user 202 may prefer check boxes instead of buttons. In this manner, the API manager 120 and interaction manager 124 can trigger the SDK 110 to provide check-boxes to the user 202 as discussed in FIGS. 3A-3C.

The interaction manager 124 can receive the request from the user device 104 and examine the request and determine a second information resource associated with a second actionable object. For example, the interaction manager 124 can receive the request from the user device 104 and determine the second information resource of a second partner server 114 corresponding to the second actionable object. Furthermore, the interaction manager 124 and application programming interface (API) manager 120 can provide the application 106 with one or more user interface elements to induce a second interaction 204 based on the previous interactions 204 of the user 202. For example, the user 202 may prefer buttons instead of checkboxes. In this manner, the API manager 120 and interaction manager 124 can trigger the SDK 110 to provide buttons to the user 202. In some embodiments, the interaction manager 124 may retrieve FHIR resource information and information corresponding to the user 202 from the application 106. The interaction manager 124 may upload the FHIR resource information and information corresponding to the user 202, to an external FHIR server or the data management system 102. In some embodiments, the interaction manager 124 may convert the information corresponding to the user 202 into an FHIR resource.

The authorization manager 128 of the data management system can authenticate, validate, or verify the user 202 of the user device 104. To authenticate the user 202, the authorization manager 128 can analyze the authentication credentials of the user 202 by matching the authentication credentials with the corresponding profile 132 of the user 202. The profile 132 can include information about the respective user 202 such as, FHIR Data 136, tokens 134, a username and password, a user ID, one or more healthcare providers, one or more partners (e.g., websites, applications, etc.), basic identification information, and interaction history. The user 202 may enter the authentication credentials (e.g., username and password) to the application 106 to access the information resource 108. The authorization manager 128 may receive the authentication credentials from the user device 104 and verify that the authentication credentials entered in the user device 104 match the authentication credentials within the profile 132.

Upon the authenticating the authentication credentials, the data source manager 126 can provide, transmit, or send a request to grant the data management system 102 access to the FHIR data 136 associated with the user 202 stored at the one or more data sources 112. The data source manager 126 may receive one or more codes 212 from the authorization manager 128 based on a successful match of authentication credentials from the user device 104 and within the database 118. The codes can be at least one of a flag, a notification to transmit the request, or an alphanumeric collection of values. The data source manager 126 can include memory to maintain a record of each data source 112 for the respective user 202 or respective profile 132. For example, the data source manager 126 may transmit a request to one or more servers that store data corresponding to a hospital to grant the data management system 102 access to the FHIR data associated with the data source manager 126. In some embodiments, the data source manager 126 can trigger the authorization manager 128 to use a token generator 210 to generate a request token to transmit to the data sources 112. The data source manager 126 can embed the codes 212 within the request token to identify the data management system 102 to the data sources 112. The benefit of the solution described is that a secure system can access and exchange data between the user 202 and the data sources 112, by using the data management system 102 as an intermediary.

The data source manager 126 may receive an access token from the data sources 112. The access token can be a security token, indicator, or flag for allowing access to specific FHIR data 136 for a provider while the access token is active. The provider can be denied access, responsive to an expiration of the access token. The access token can at least include a header, a payload, and a signature, among other aspects to specify the contents of the access token. Prior to receiving the access token, the data source manager 126 can provide the access token to the data source 112 upon completion of registration by the user. Upon receiving the access token, the data source manager 126 can store the access token in the tokens 134 associated with the profile 132 of the user 202. By storing the access token in the tokens 134, the data source manager 126 may extract the access token for future use by the user. For example, at a first time period, the data source manager 126 can transmit the request to the data sources 112 to grant access to the data management system 102. The data source manager 126 can refresh, ping, or query the access token for a time period to verify, detect, or otherwise identify the expiration of the access token. The time period can be between 4-24 hours and the data source manager 126 can cause the access token to expire if the time period is greater than a specified time period (e.g., 8 hours, 24 hours). The data sources 112 can transmit the access token to the data source manager 126 to provide access to the FHIR data 136 associated with the user 202. The access token can allow the data management system 102 to retrieve the FHIR data 136 of the user from the one or more data sources 112, while the access token is active.

The data source manager 126 can subsequently transmit a refresh token to the data source 112. The refresh token can be a token, a flag, an indicator, or a marker which indicates that a permission for the data source 112 to access the FHIR data 136. The refresh token can specify a respective data source 112 for access to the FHIR data 136. The refresh token can be active or expired. The user can specify when the refresh token is active and when the refresh token expires. The refresh token can be transmitted to the data source 112 in response to the user specifying the data source 112 during the registration process. While the refresh token is active, the data source 112 and the data source manager 126 can transmit and receive the access tokens to access portions of the FHIR data 136. Upon expiration of the refresh token, the data source 112 may not have access to any FHIR data 136 of the user. For example, upon registration of the user, the user can specify that a first data source 112 can access the demographics and vital signs for a given time period (e.g., one month, two months, three months, one year, two years, etc.) and the data source manager 126 can provide the refresh token to the first data source 112. In some instances, the refresh token can expire in response to a condition such as a change in insurance, an indication from the user, change in provider, change in home address, etc. Upon expiration of the time period, the refresh token can subsequently expire, thereby revoking access to the FHIR data 136 from the data source 112 or the partner.

In this manner, the technical solutions described herein can prevent the need to make multiple requests or system calls (e.g., API calls) to obtain the tokens (e.g., refresh token) thereby reducing latency, reducing utilization, improving computer performance, reducing wasted computing resources, and saving memory by utilizing the access tokens and the refresh tokens. For example, the refresh token can remove a need for the data source 112 to generate and transmit API requests to obtain a new token each time the data source 112 may access the FHIR data 136 of the user. Furthermore, the use of the access tokens in this manner can prevent the unnecessary generation and storage of subsequent access tokens while the refresh token is active. For example, the database 118 and the data sources 112 can maintain an expired access token while the refresh token is active. In this manner, the data management system 102 can re-activate the access token when needed on request by the data source 112 thereby saving computing resources that would be otherwise wasted on the generation of a new access token. The technical solutions described herein can improve security using the refresh tokens and access tokens, thereby preventing data leakages, enhancing system performance, preventing unauthorized access, maintaining data integrity, and reducing data loss. For instance, the expiration of the access token after a given time period (e.g., can prevent a data source from viewing FHIR data (e.g., medical history, insurance, etc.) after, for example, four hours, five hours, six hours, 10 hours, 24 hours etc., without the submission of a request to the data management system 102. Furthermore, the expiration of the refresh token can block, prevent, or otherwise revoke access to all FHIR data associated with the user from the data source or the partner. The expiration of the refresh token can be specified by the user, thereby giving more control to the user regarding the use and distribution of the medical data.

In some embodiments, the system can include one or more data management systems 102. Each data management system 102 may search or traverse endpoints associated with the one or more data management systems 102 and save the endpoints as a file (e.g., document, PDF, data structure, storage object). In some embodiments, the data management system 102 may save the endpoints to retrieve the FHIR data 136 from the database 118. In some embodiments, the data management system 102 may update information about the user 202 in response to a trigger from the authorization manager 128. In some embodiments, the interaction manager 128 may trigger a user device 104C to display an application 106 to provide the user 202 with data associated with the user 202. In some embodiments, one data management system 102 may transmit a request to each endpoint to retrieve FHIR resources in a centralized data management system 102. In some embodiments, the data management system 102 may store non-FHIR resource information or sources in the database 118.

The data source manager 126 and the API manager 120 may transmit a request to access the FHIR data 136 within the data sources 112 corresponding to the user 202. To retrieve the FHIR data 136, the data source manager and the API manager 120 may transmit the access token along with the request. The API manager 120 may use one or more API's corresponding to the data sources 112 to transmit the access token. For example, an API can provide a standardized way to format the FHIR data 136 of the data source 112 to match the format of the FHIR data 136 within the profile 132 of the user 202. In another example, an API can access the FHIR data 136 from the data sources 112. The access token can be unique for each profile 132 in the database 118 to prevent the wrong user 202 from accessing the wrong FHIR data 136. For example, if the data source manager 120 transmits an access token that does not correspond to the respective user 202, the API manager 120 can use one or more APIs to the data sources 112 to block the request to access the FHIR data 136 within the data source 112. In response to the data sources 112 receiving the request, the data sources 112 can transmit the FHIR data 136 to the data source manager 126 and the API manager 120. In some embodiments, the data source manager 126 and the API manager 120 may transmit a second request to access the FHIR data 136 within the data sources 112 corresponding to the user 202.

The data source manager 126 and the API manager 120 may receive, access, or retrieve the FHIR data via the one or more APIs of the data sources 112. Upon reception of the FHIR data, the data source manager 126 and the API manager 120 may store the FHIR data 136 in one or more data structures managed by the FHIR manager 122. The FHIR manager 122 may generate one or more data structures to hold the FHIR data 136. The FHIR manager 122 can store the one or more data structures within the profiles 132. Referring now to FIG. 5, FIG. 5 depicts an example data structure 500 generated by the FHIR manager 122 and stored within the profile 132. The data structure 500 can include one or more user ID's 502A-N (generally referred to as a "user ID 502" or as "user IDs 502"), one or more healthcare sources 504A-N (generally referred to as a "healthcare 504" or as "healthcare sources 504"), 506A-N (generally referred to as a "scope 506" or as "scopes 506"), and partners 508A-N (generally referred to as a "partner 508" or as "partners 508"). The partners 508 may be described in a similar manner to the partner server 114 described above. In some arrangements, the partners 508 may be the names of an organization hosting the partner server 114.

The profile generator 130 can generate, create, or determine the user ID 502 by executing one or more functions to create randomize a collection of alphanumeric values. The user ID 502 may include the collection of alphanumeric values to distinguish and identify each user 202 within the profiles 132. For example, a first user 202 may have "JS1293" as a user ID 502A. In another example, a second user 202 may have "JD1680" as a user ID 502B. Each user ID 502 can correspond to the one or more healthcare sources 504 indicating that one or more users 202 may attend similar healthcare sources 504. For example, a first user 202 with a user ID 502A and a second user 202 with user ID 502B may attend the same healthcare source 504 (e.g., hospital, clinic, physician), therefore the healthcare source 504 may include FHIR data 136 for the first user 202 and the second user 202. The healthcare sources 504 may be described in a similar manner as the data sources 112 because data management system 102 interacts with the online server (e.g., Cloud server, Web server, Database server, proxy server, etc.) of the healthcare sources 504. For example, the data source manager 126 may retrieve and transmit the tokens 134 to an online server of the healthcare sources 504 or otherwise the data source 112 corresponding to the healthcare sources 504.

The FHIR data 136 can include a list, table, matrix, or collection of the scopes 506. The scopes 506 can indicate one or more portions of the FHIR data 136 that a partner 508 may access. For example, the FHIR data 136 can include allergy records, medication history, vital signs, demographics, and family conditions. The scopes 506A-C can include family conditions, medication history and demographics. Therefore, partners 508 can access the scopes 506A-C of the FHIR data 136, if the partners 508 have consent to the scopes 506A-C. For example, the FHIR data 136A can include scopes A-F. The scope 506A-F can include consent for a first partner 508A and a second partner 508, that correspond to a first partner server 114A and second partner server 114B, respectively. The profiles 132 can store the list of partners 508 for which the user 202 corresponding to the user ID 502 may transmit the FHIR data 136 from the healthcare 504 to the partner 508 (or partner sever 114). For example, the user 202 with user ID 502A can have a first partner 508B and a second partner 508D located within the FHIR data 136A within the healthcare 504D.

In some embodiments, the data structure 500 can include consent for each partner 508. The user 202 determines, assigns, or establishes the consent for each partner 508 when the user 202 creates a profile 132 or during the duration of using the application 106. The consent can restrict or allow the transmission of the FHIR data to the partner 508. For example, FHIR data 136B in healthcare 504C can include a first partner 508B and a second partner 508E. The user 202 may give consent to the first partner 508B. In this manner, the data management system 102 may transmit the FHIR data 136B to first partner 508 unless consent is given to the second partner 508. Each user 202 can establish any number of consent for the partners 508. For example, a first user ID 502 may give consent to two partners 508A-B, whereas a second user ID 502B may give consent to three partners 508B-D.

The consent may identify or specify a type of FHIR data 136 or a portion of FHIR data 136 to transmit to the partner server 114 based on the scopes 506. For example, the consent may specify that the partner 504B access scopes 506G-I which correspond to allergies to medications, demographics, and blood pression of the user ID 502B, whereas the partner 504K may not have access to any of the scopes 606. Using the consent, the user's 202 can restrict and manage FHIR data 136 accessible by the partners 508. The FHIR manager 122 can provide a user interface to provide access control and an option to revoke consent to the one or more partners 508 as shown in FIGS. 6A-6B.

Figure 6A:
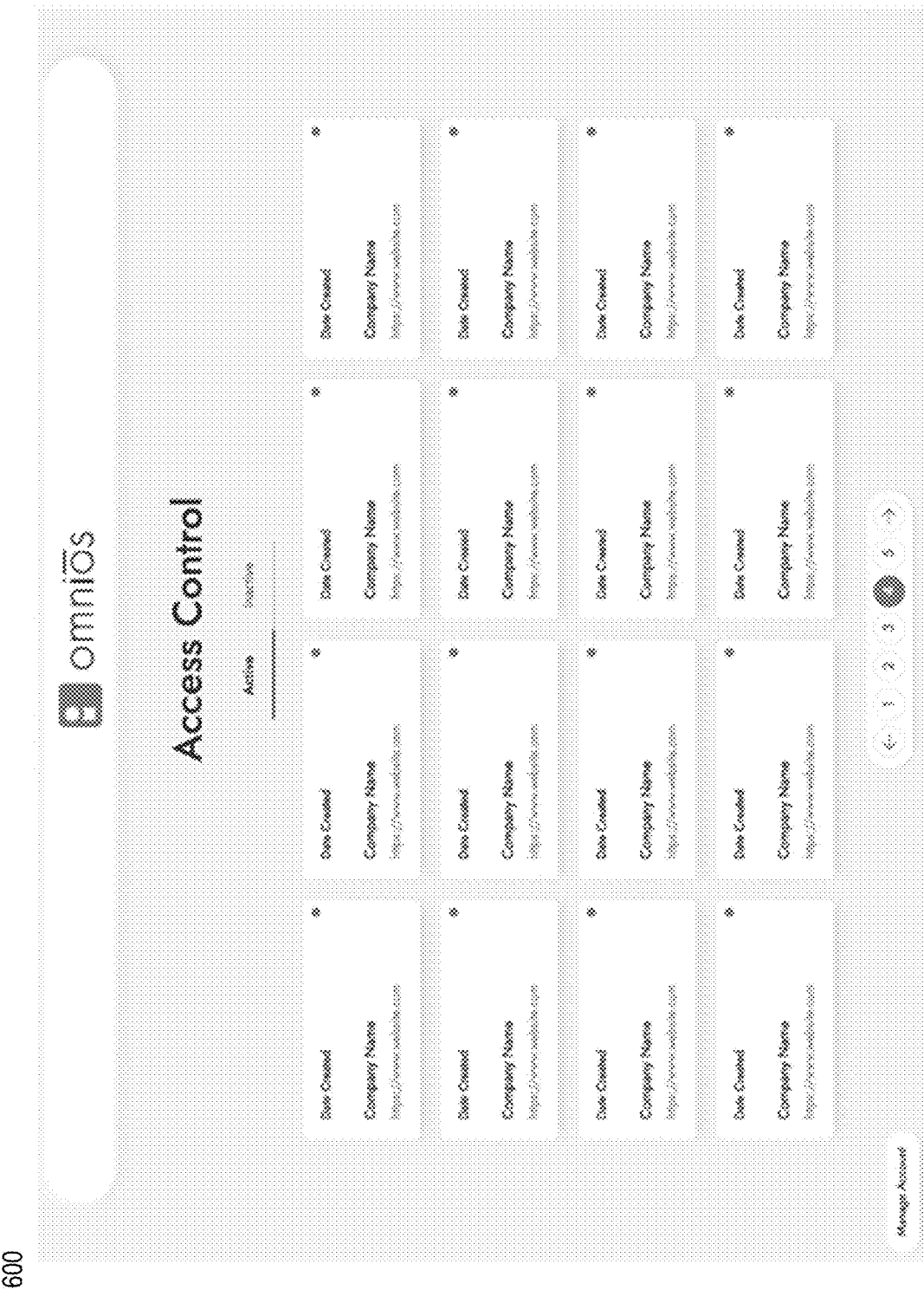
FIG. 6A depicts an example user interface for managing access for the partners, in accordance with an embodiment.
Figure 6B:
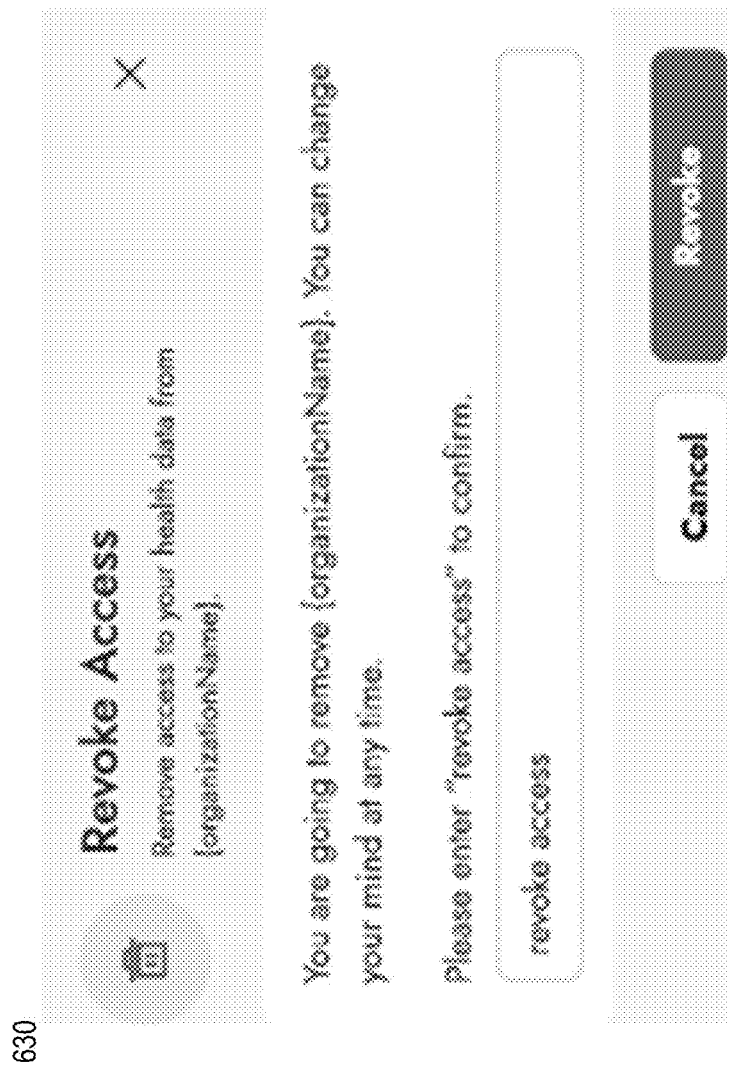
FIG. 6B depicts an example user interface for revoking consent to the partners, in accordance with an embodiment.

FIG. 6A depicts an example user interface 600 for managing access for the partners 508. The user interface 600 can include one or more partners 508. Each partner 508 can include a partner name, a creation date, and a link to the provider portal. The interaction manager 124 may monitor the user interface to detect an interaction 204 with the option to revoke consent as shown in user interface 630 of FIG. 6B. In this manner, the interaction 204 may include a button press or keyboard interaction. In response to the interaction 204, the FHIR manager 122 may update the one or more data structures 500 to remove the one or more partners 508 from the respective scope 506. For example, the user 202 may revoke access from partner 508C. The FHIR manager 122 may update the data structure 500 to remove the partner 508C from the scopes 506 of the FHIR data 136.

Figure 7:
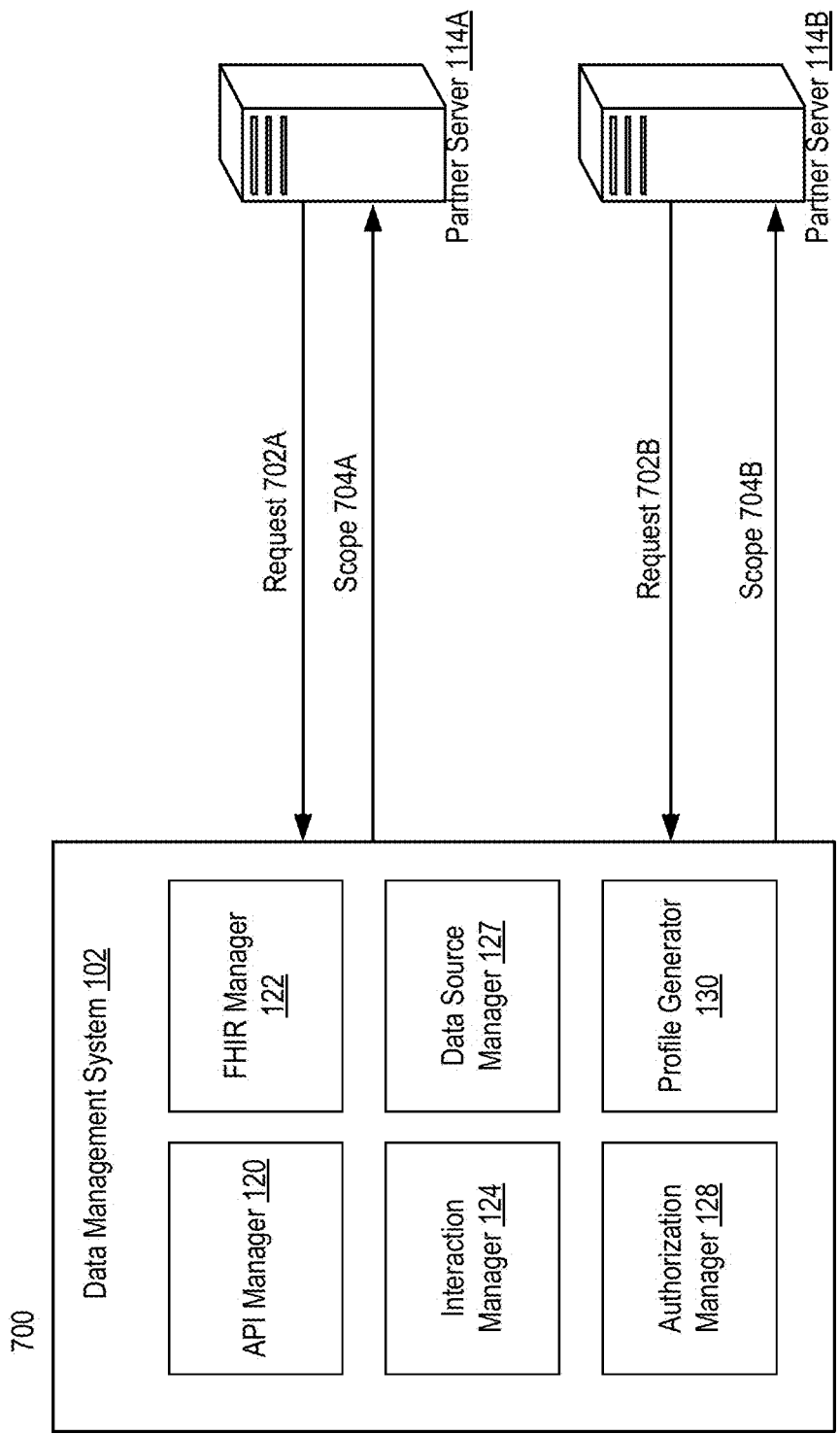
FIG. 7 depicts a system for an exchange of requests between the system and the partner server, in accordance with an embodiment.

Referring now to FIG. 7, FIG. 7 depicts an example 700 of an exchange of requests between the data management system 102 and the partner server 114. The partner server 114 may transmit one or more requests 702A-N (generally referred to as a "request 702" or as "requests 702") to the data management system 102. The partner server 114 may use to request 702 to retrieve an access code 212 that the user 202 can exchange for an access token 134. The access code 212 may provide the partner server 114 access to the FHIR data 136 associated with the data sources 112. During this process, the data management system 102 can transmit scopes 704A-N (generally referred to as a "scope 704" or as "scopes 704") to one or more partner servers 114. The scopes 704 can identify, indicate, or determine one or more portions of the FHIR data 136 to transmit to the partner server 114. For example, the FHIR data 136 can include the medical history associated with the user's 202 diagnosis of diabetes. The scope 704 may identify the medication history associated with the users 202 diabetes. The scopes 704 are the same as the scopes 506. In another example, a second partner server 114B can transmit the request 702B to the data management system 102 at the same time as the partner server 114A. The data management system 102 may follow a similar process as described above and transmit the scope 704B to the partner server 114B. Therefore, the data management system 102 can handle multiple interactions with multiple partner servers 114.

In some embodiments, the partner server 114 can transmit a subsequent request 702B to the data management system 102. The subsequent request 702 can indicate more FHIR data 136 for the user 202. The authorization manager 128 may verify that the partner server 114 has consent before authorizing the transmission of the scope 704. Using the consent, the FHIR manager 122 may determine, identify, or access a second portion of data associated with the FHIR data 136 and transmit the data within the scope 704.

The data management system 102 may exchange the access code 212 for a usable access token 134 corresponding to the respective data source 112. For example, to access the user's 202 demographics for the data source 112G, the partner server 114 may exchange the access code 212 for the access token 134 that grants access to the demographics of data source 112G. Upon acceptance of the access token 134, the data source manager 126 may transmit the demographics of the user 202 to the partner server 114. The partner server 114 may store the demographics of the user 202 in the partner database 116 for reference in the future. The partner database 116 may store the access token 134 increase the speed of receiving user data from the data source 112.

Prior to transmitting the FHIR data 136 to the partner server 114, the authorization manager may verify, identify, or determine that the partner server 114 has consent to access the FHIR data 136. During the verification process, the authorization manager 128 may retrieve the profile 132 corresponding to the user 202 and access the data structure 500 to parse each partner 508 to search for the consent. In this manner, the data management system 102 can improve the security of the FHIR data 136 by refusing to transmit any portions of data unless the partners 508 or partner server 114 obtain consent.

Figure 8:
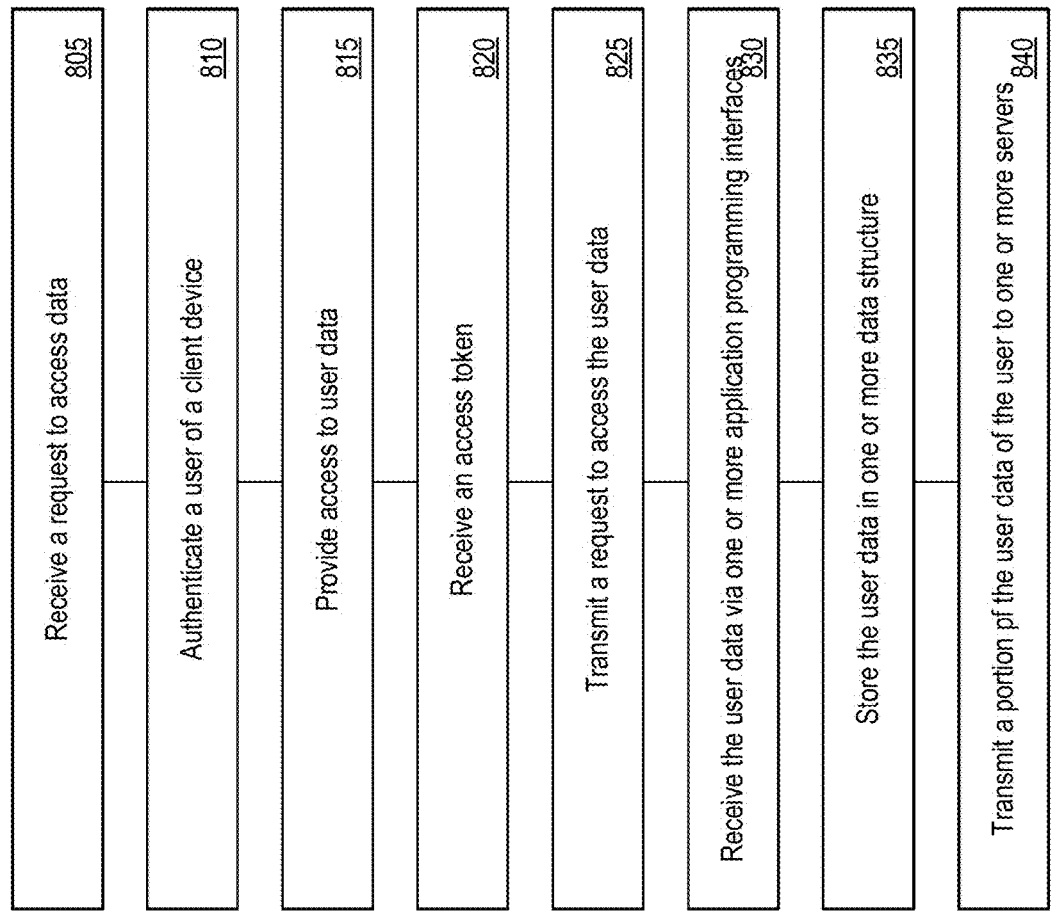
FIG. 8 depicts a flowchart to implement secure access to the data via SDK configuration, in accordance with an embodiment.

FIG. 8 depicts a flowchart method 800 for implementing secure access to the data. The method 800 can include at operation 805, receiving, by a data management system 102, a request to access data. The data management system 102 may receive the request responsive to the interaction manager 124 detecting an interaction 204 of a user 202 with an actionable object 302 within an information resource 108 of an application 106 on a user device 104. The actionable object presented within the information resource 108 of the application 106 is presented via a software development kit (SDK) 110 of the data management system 102. The method can include, receiving, by an authorization manager 128, authentication credentials from the client device. The authentication credentials including a client identifier and a password corresponding to the client device. The method can include, at operation 810, authenticating, by the authorization manager 128, the user 202 of the user device 104. The authorization manager 128 may authenticate the user 202 in response to the data management system 102 receiving the authentication credentials from the user device 104.

At operation 815, the method can include, providing, by a data source manager 126 to a data source 112, a request to grant the data management system 102 access to user data stored at the one or more data sources. The request can include an identifier identifying the data management system 102. The method can include, at operation 820, receiving, by the data source manager 126, an access token 134 to allow the data management system 102 to retrieve user data of the user 202 from the one or more data sources 112. The method can include, at operation 825, transmitting, by an application programming interface (API) manager 120, via one or more of the one or more data sources 112, a request to access the user data 116 of the user 202 using the access token 134 assigned to the data management system 102.

At operation 830, the method can include, receiving, by a FHIR manager 122, the user data 116 via the one or more APIs responsive to transmitting the request to access the user data 116. At operation, 835, the method can include, storing, by the FHIR manager 122 and the profile generator 130, the user data 116 in one or more data structures 500 managed by the data management system 102. The method can include, storing, by the FHIR manager 122, consent data about the user data 116 in one or more data structures 500 managed by the data management system 102 based on a partner identifier. The consent data may indicate that the data management system 102 is configured to transmit data to the one or more servers 114 of the application 106. The method can include, providing, by the authorization manager 128 or the interaction manager 124, a user interface to the user 202 of the user device 104. Responsive to the interaction 204 with the user interface to revoke consent to share the user data 116 of the user 202 with the application 106, update the one or more data structures 500 managed by the data management system 102 to restrict the data management system from sharing the user data 116 with the application 106.

At operation 840, the method can include transmitting, by the data management system 102, a portion (e.g., scopes 704) of the user data 116 of the user 202 to the one or more servers (e.g., partner servers 114) of the provider portal (e.g., partners 508, application 106) based on one or more values corresponding to a type of data obtained at registration of the application 106 with the data management system 102. The method can include, transmitting, by the data management system 102, responsive to a subsequent data request 702 from the one or more servers 114 of the application 106, a second portion of the user data 116 of the user 202 to the application 106 based on the one or more values corresponding to the type of data obtained at registration of the application 106.

Figure 9:
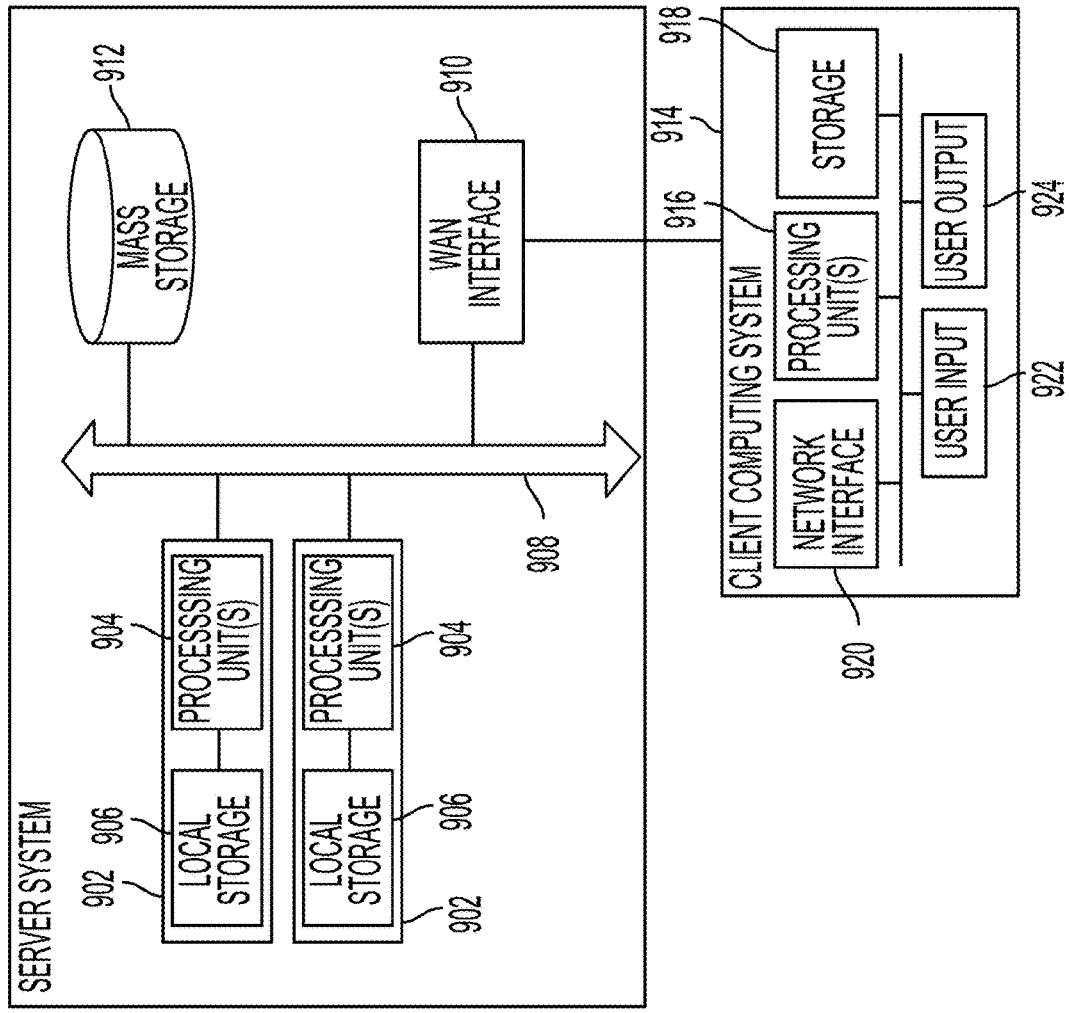
FIG. 9 depicts an example computing system, in accordance with an embodiment.

Various operations described herein can be implemented on computer systems, which can be of generally conventional design. FIG. 9 shows a simplified block diagram of a representative server system 900 and client computer system 914 usable to implement certain embodiments of the technical solutions described herein. In various embodiments, server system 900 or similar systems can implement services or servers described herein or portions thereof. Client computer system 914 or similar systems can implement clients described herein. Each of the systems 100, 200 and others described herein can be similar to the server system 900.

Server system 900 can have a modular design that incorporates a number of modules 902 (e.g., blades in a blade server embodiment); while two modules 902 are shown, any number can be provided. Each module 902 can include processing unit(s) 904 and local storage 906.

Processing unit(s) 904 can include a single processor, which can have one or more cores, or multiple processors. In some embodiments, processing unit(s) 904 can include a general-purpose primary processor as well as one or more special-purpose co-processors such as graphics processors, digital signal processors, or the like. In some embodiments, some or all processing units 904 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 904 can execute instructions stored in local storage 906. Any type of processors in any combination can be included in processing unit(s) 904.

Local storage 906 can include volatile storage media (e.g., conventional DRAM, SRAM, SDRAM, or the like) and/or non-volatile storage media (e.g., magnetic or optical disk, flash memory, or the like). Storage media incorporated in local storage 906 can be fixed, removable or upgradeable as desired. Local storage 906 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 904 need at runtime. The ROM can store static data and instructions that are needed by processing unit(s) 904. The permanent storage device can be a non-volatile read-and-write memory device that can store instructions and data even when module 902 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some embodiments, local storage 906 can store one or more software programs to be executed by processing unit(s) 904, such as an operating system and/or programs implementing various server functions such as functions of the system 100 of FIG. 1 or any other system described herein.

"Software" refers generally to sequences of instructions that, when executed by processing unit(s) 904 cause server system 900 (or portions thereof) to perform various operations, thus defining one or more specific machine embodiments that execute and perform the operations of the software programs. The instructions can be stored as firmware residing in read-only memory and/or program code stored in non-volatile storage media that can be read into volatile working memory for execution by processing unit(s) 904. Software can be implemented as a single program or a collection of separate programs or program modules that interact as desired. From local storage 906 (or non-local storage described below), processing unit(s) 904 can retrieve program instructions to execute and data to process in order to execute various operations described above.

In some server systems 900, multiple modules 902 can be interconnected via a bus or other interconnect 908, forming a local area network that supports communication between modules 902 and other components of server system 900.

Interconnect 908 can be implemented using various technologies including server racks, hubs, routers, etc.

A wide area network (WAN) interface 910 can provide data communication capability between the local area network (interconnect 908) and a larger network, such as the Internet. Conventional or other activities technologies can be used, including wired (e.g., Ethernet, IEEE 902.3 standards) and/or wireless technologies (e.g., Wi-Fi, IEEE 902.11 standards).

In some embodiments, local storage 906 is intended to provide working memory for processing unit(s) 904, providing fast access to programs and/or data to be processed while reducing traffic on interconnect 908. Storage for larger quantities of data can be provided on the local area network by one or more mass storage subsystems 912 that can be connected to interconnect 908. Mass storage subsystem 912 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 912. In some embodiments, additional data storage resources may be accessible via WAN interface 910 (potentially with increased latency).

Server system 900 can operate in response to requests received via WAN interface 910. For example, one of modules 902 can implement a supervisory function and assign discrete tasks to other modules 902 in response to received requests. Conventional work allocation techniques can be used. As requests are processed, results can be returned to the requester via WAN interface 910. Such operation can generally be automated. Further, in some embodiments, WAN interface 910 can connect multiple server systems 900 to each other, providing scalable systems capable of managing high volumes of activity. Conventional or other techniques for managing server systems and server farms (collections of server systems that cooperate) can be used, including dynamic resource allocation and reallocation.

Server system 900 can interact with various user-owned or user-operated devices via a wide-area network such as the Internet. An example of a user-operated device is shown in FIG. 8 as client computing system 914. Client computing system 914 can be implemented, for example, as a consumer device such as a smartphone, other mobile phone, tablet computer, wearable computing device (e.g., smart watch, eyeglasses), desktop computer, laptop computer, and so on.

For example, client computing system 914 can communicate via WAN interface 910. Client computing system 914 can include conventional computer components such as processing unit(s) 916, storage device 918, network interface 920, user input device 922, and user output device 924. Client computing system 914 can be a computing device implemented in a variety of form factors, such as a desktop computer, laptop computer, tablet computer, smartphone, other mobile computing device, wearable computing device, or the like.

Processor 916 and storage device 918 can be similar to processing unit(s) 904 and local storage 906 described above. Suitable devices can be selected based on the demands to be placed on client computing system 914; for example, client computing system 914 can be implemented as a "thin" client with limited processing capability or as a high-powered computing device. Client computing system 914 can be provisioned with program code executable by processing unit(s) 916 to enable various interactions with server system 900 of a message management service such as accessing messages, performing actions on messages, and other interactions described above. Some client computing systems 914 can also interact with a messaging service independently of the message management service.

Network interface 920 can provide a connection to a wide area network (e.g., the Internet) to which WAN interface 910 of server system 900 is also connected. In various embodiments, network interface 920 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 922 (or user devices 104) can include any device (or devices) via which a user can provide signals to client computing system 914; client computing system 914 can interpret the signals as indicative of particular user requests or information. In various embodiments, user input device 922 can include any or all of a keyboard, touch pad, touch screen, mouse or other pointing device, scroll wheel, click wheel, dial, button, switch, keypad, microphone, and so on.

User output device 924 (or user devices 104) can include any device via which client computing system 914 can provide information to a user. For example, user output device 924 can include a display to display images generated by or delivered to client computing system 914. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 924 can be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 904 and 916 can provide various functionality for server system 900 and client computing system 914, including any of the functionality described herein as being performed by a server or client, or other functionality associated with message management services.

It will be appreciated that server system 900 and client computing system 914 are illustrative and that variations and modifications are possible. Computer systems used in connection with embodiments of the technical solutions described herein can have other capabilities not specifically described here. Further, while server system 900 and client computing system 914 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the technical solutions described herein can be realized in a variety of apparatus including electronic devices implemented using any combination of circuitry and software.

While the disclosure has been described with respect to specific embodiments, one skilled in the art will recognize that numerous modifications are possible. For instance, although specific examples of rules (including triggering conditions and/or resulting actions) and processes for generating suggested rules are described, other rules and processes can be implemented. Embodiments of the disclosure can be realized using a variety of computer systems and communication technologies including but not limited to specific examples described herein.

Embodiments of the technical solutions described herein can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the technical solutions described herein may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

What is claimed is:

1. A system comprising:
   one or more processors of a data management system coupled to memory, the one or more processors of the data management system configured to:
      receive, responsive to an interaction with an actionable object presented within an information resource of a provider portal at a client device of a user, a request to access data;
      authenticate, responsive to receiving data management system credentials from the client device, the user of the client device;
      provide, to an electronic health record data source, a request to grant, to the data management system, access to user electronic health record data of the user stored at one or more electronic health record data sources, the request including a client identifier identifying the data management system;
      receive, responsive to the request to grant, an access token assigned to the data management system on behalf of the user to allow the data management system to retrieve user electronic health record data of the user from the one or more electronic health record data sources;
      transmit, via one or more application programming interfaces (API) of the one or more electronic health record data sources, a request to access the user electronic health record data of the user using the access token assigned to the data management system;
      receive the user electronic health record data via the one or more APIs, responsive to transmitting the request to access the user electronic health record data;
      store the user electronic health record data in one or more data structures managed by the data management system;
      receive a request from one or more servers of the provider portal to access a portion of the user electronic health record data;
      transmit, responsive to the request from the one or more servers of the provider portal, the portion of the user electronic health record data of the user to the one or more servers of the provider portal in accordance with one or more types of data defined at registration of the provider portal with the data management system such that the data management system restricts transmission of a remaining portion of the user electronic health record data stored in the one or more data structures managed by the data management system;
      receive, responsive to a second interaction with a second actionable object presented within a second information resource of a second provider portal at the client device, a data access request to access data;
      authenticate, responsive to receiving the data management system credentials from the client device, the user of the client device;
      provide, to a second electronic health record data source of the one or more data sources, a second request to grant, to the data management system, access to user electronic health record data of the user stored at the second electronic health record data source, the second request including the client identifier identifying the data management system;
      receive, responsive to the second request to grant, the second access token assigned to the data management system on behalf of the user to allow the data management system to retrieve the user electronic health record data of the user from the one or more electronic health record data sources;
      transmit, via the one or more application programming interfaces (API) of the one or more electronic health record data sources, a second request to access the user electronic health record data of the user using the second access token assigned to the data management system;

receive the user electronic health record data via the one or more APIs, responsive to transmitting the second request to access the user electronic health record data of the user;

store the user electronic health record data of the user in the one or more data structures managed by the data management system;

receive a second request from one or more servers of the provider portal to access a second portion of the user electronic health record data; and transmit, responsive to the second request from the one or more servers of the second provider portal, the second portion of the user electronic health record data of the user to the one or more servers of the second provider portal in accordance with one or more types of data defined at registration of the second provider portal with the data management system such that the data management system restricts transmission of a remaining portion of the user electronic health record data stored in the one or more data structures managed by the data management system, wherein the second portion of the user data of the user differs from the portion of the user data of the user.

2. The system of claim 1, wherein the user is a first user and the client device is a first client device and wherein the one or more processors are further configured to:

receive, responsive to a second interaction with the actionable object presented within the information resource of the provider portal at a second client device of a second user, a data access request to access data;

authenticate, responsive to receiving second data management system credentials from the second client device, the second user of the second client device;

provide, to a second electronic health record data source, a second request to grant, to the data management system, access to second user electronic health record data of the second user stored at the one or more electronic health record data sources, the second request including the client identifier identifying the data management system;

receive, responsive to the second request to grant, a second access token assigned to the data management system on behalf of the user to allow the data management system to retrieve second user electronic health record data of the second user from the one or more data sources;

transmit, via the one or more application programming interfaces (API) of the one or more electronic health record data sources, a second request to access the second user electronic health record data of the second user using the second access token assigned to the data management system;

receive the second user electronic health record data via the one or more APIs responsive to transmitting the second request to access the second user data;

store the second user electronic health record data in one or more second data structures managed by the data management system;

receive a second request from one or more servers of the provider portal to access a respective portion of the user electronic health record data; and transmit, responsive to the second request from the one or more servers of the provider portal, the respective portion of the second user electronic health record data of the second user to the one or more servers of the provider portal in accordance with one or more types of data defined at registration of the provider portal with the data management system such that the data management system restricts transmission of a remaining portion of the user electronic health record data stored in the one or more data structures managed by the data management system.

3. The system of claim 1, wherein the one or more types of data includes a medical history, medical records, medical conditions, immunization records, clinical notes, or medications.

4. The system of claim 1, wherein the one or more processors are further configured to:

receive, responsive to a second interaction with a second actionable object presented within a second information resource of a second provider portal at a second client device, a data access request to access data;

authenticate, responsive to receiving second data management system credentials from the second client device, a second user of the second client device;

provide, to a second electronic health record data source of the one or more data sources, a second request to grant, to the data management system, access to second user electronic health record data of the second user stored at the one or more electronic health record data sources, the second request to grant including the client identifier identifying the data management system;

receive, responsive to the second request to grant, a second access token assigned to the data management system on behalf of the user to allow the data management system to retrieve second user electronic health record data of the second user from the one or more second electronic health record data sources;

transmit, via the one or more application programming interfaces (API) of the one or more electronic health record data sources, a second request to access the second user electronic health record data of the second user using the access token assigned to the data management system;

receive the second user electronic health record data via the one or more APIs responsive to transmitting the second request to access the second user electronic health record data;

store the second user electronic health record data of the second user in one or more second data structures managed by the data management system;

receive a second request from the one or more servers of the provider portal to access portions of the user electronic health record data; and transmit, responsive to second request from the one or more servers of the second provider portal, the portions of the second user electronic health record data of the second user to the one or more servers of the second provider portal in accordance with one or more types of data defined at registration of the second provider portal with the data management system such that the data management system restricts transmission of a remaining portion of the user electronic health record data stored in the one or more data structures managed by the data management system.

5. The system of claim 1, wherein the one or more processors are further configured to transmit, responsive to a subsequent data request from the one or more servers of the provider portal, a third portion of the user electronic health record data of the user to the provider in accordance with one or more types of data defined at registration of the provider portal.

6. The system of claim 1, wherein the one or more processors are further configured to receive the data management system credentials from the client device, the data management system credentials including a client identifier and a password corresponding to the client device.

7. The system of claim 1, wherein the one or more processors are further configured to transmit, responsive to the request from the one or more servers of the provider portal, the portion of the user data of the user to the client device in accordance with one or more types of data defined at registration of the provider portal.

8. The system of claim 1, wherein the one or more processors are further configured to store consent data about the user data in one or more data structures managed by the data management system based on a partner identifier, the consent data indicating that the data management system is configured to transmit data to the one or more servers of the provider portal.

9. The system of claim 8, wherein the one or more processors are further configured to provide a user interface to the user of the client device, and responsive to an interaction with the user interface to revoke consent to share the user data of the user with the provider portal, update the one or more data structures managed by the data management system to restrict the data management system from sharing the user data with the provider portal.

10. The system of claim 1, wherein the actionable object presented within the information resource of the provider portal is presented via a software development kit (SDK) of the data management system.

11. A computer implemented method comprising:
receiving, by one or more processors, responsive to an interaction with an actionable object presented within an information resource of a provider portal at a client device of a user, a request to access data;
authenticating, by the one or more processors, responsive to receiving data management system credentials from the client device, the user of the client device;
providing, by the one or more processors, to an electronic health record data source, a request to grant, to the data management system, access to user electronic health record data of the user stored at one or more electronic health record data sources, the request including a client identifier identifying the data management system;
receiving, by the one or more processors, responsive to the request to grant, an access token assigned to the data management system on behalf of the user to allow the data management system to retrieve user electronic health record data of the user from the one or more electronic health record data sources;
transmitting, by the one or more processors, via one or more application programming interfaces (API) of the one or more electronic health record data sources, a request to access the user electronic health record data of the user using the access token assigned to the data management system;
receiving, by the one or more processors, the user electronic health record data via the one or more APIs, responsive to transmitting the request to access the user electronic health record data;
storing, by the one or more processors, the user electronic health record data in one or more data structures managed by the data management system;
receiving, by the one or more processors, a request from one or more servers of the provider portal to access a portion of the user electronic health record data;
transmitting, by the one or more processors, responsive to the request from the one or more servers of the provider portal, the portion of the user electronic health record data of the user to the one or more servers of the provider portal in accordance with one or more types of data defined at registration of the provider portal with the data management system such that the data management system restricts transmission of a remaining portion of the user electronic health record data stored in the one or more data structures managed by the data management system;
receiving, by the one or more processors, responsive to a second interaction with a second actionable object presented within a second information resource of a second provider portal at the client device, a data access request to access data;
authenticating, by the one or more processors, responsive to receiving the data management system credentials from the client device, the user of the client device;
providing, by the one or more processors, to a second electronic health record data source of the one or more data sources, a second request to grant, to the data management system, access to user electronic health record data of the user stored at the second electronic health record data source, the second request including the client identifier identifying the data management system;
receiving, by the one or more processors, responsive to the second request to grant, the second access token assigned to the data management system on behalf of the user to allow the data management system to retrieve the user electronic health record data of the user from the one or more electronic health record data sources;
transmitting, by the one or more processors, via the one or more application programming interfaces (API) of the one or more electronic health record data sources, a second request to access the user electronic health record data of the user using the second access token assigned to the data management system;
receiving, by the one or more processors, the user electronic health record data via the one or more APIs, responsive to transmitting the second request to access the user electronic health record data of the user;
storing, by the one or more processors, the user electronic health record data of the user in the one or more data structures managed by the data management system;
receiving, by the one or more processors, a second request from one or more servers of the provider portal to access a second portion of the user electronic health record data; and
transmitting, by the one or more processors, responsive to the second request from the one or more servers of the second provider portal, the second portion of the user electronic health record data of the user to the one or more servers of the second provider portal in accordance with one or more types of data defined at registration of the second provider portal with the data management system such that the data management system restricts transmission of a remaining portion of the user electronic health record data stored in the one or more data structures managed by the data management system, wherein the second portion of the user data of the user differs from the portion of the user data of the user.

12. The method of claim 11, wherein the user is a first user and the client device is a first client device, further comprising:
receiving, by the one or more processors, responsive to a second interaction with the actionable object presented within the information resource of the provider portal at a second client device of a second user, a data access request to access data;
authenticating, by the one or more processors, responsive to receiving second data management system credentials from the second client device, the second user of the second client device;
providing, by the one or more processors, to a second electronic health record data source, a second request to grant, to the data management system, access to second user electronic health record data of the second user stored at the one or more electronic health record data sources, the second request including the client identifier identifying the data management system;
receiving, by the one or more processors, responsive to the second request to grant, a second access token assigned to the data management system on behalf of the user to allow the data management system to retrieve second user electronic health record data of the second user from the one or more data sources
transmitting, by the one or more processors, via the one or more application programming interfaces (API) of the one or more electronic health record data sources, a second request to access the second user electronic health record data of the second user using the second access token assigned to the data management system;
receiving, by the one or more processors, the second user electronic health record data via the one or more APIs responsive to transmitting the second request to access the second user data;
storing, by the one or more processors, the second user electronic health record data in one or more second data structures managed by the data management system;
receiving, by the one or more processors, a second request from one or more servers of the provider portal to access a respective portion of the user electronic health record data; and
transmitting, by the one or more processors, responsive to the second request from the one or more servers of the provider portal, the respective portion of the second user electronic health record data of the second user to the one or more servers of the provider portal in accordance with one or more types of data defined at registration of the provider portal with the data management system such that the data management system restricts transmission of a remaining portion of the user electronic health record data stored in the one or more data structures managed by the data management system.

13. The method of claim 11, wherein the one or more types of data includes a medical history, medical records, medical conditions, immunization records, clinical notes, or medications.

14. The method of claim 11, further comprising:
receiving, by the one or more processors, responsive to a second interaction with a second actionable object presented within a second information resource of a second provider portal at a second client device, a data access request to access data;
authenticating, by the one or more processors, responsive to receiving second data management system credentials from the second client device, a second user of the second client device;
providing, by the one or more processors, to a second electronic health record data source of the one or more data sources, a second request to grant, to the data management system, access to second user electronic health record data of the second user stored at the one or more electronic health record data sources, the second request to grant including the client identifier identifying the data management system;
receiving, by the one or more processors, responsive to the second request to grant, a second access token assigned to the data management system on behalf of the user to allow the data management system to retrieve second user electronic health record data of the second user from the one or more second electronic health record data sources;
transmitting, by the one or more processors, via the one or more application programming interfaces (API) of the one or more electronic health record data sources, a second request to access the second user electronic health record data of the second user using the access token assigned to the data management system;
receiving, by the one or more processors, the second user electronic health record data via the one or more APIs responsive to transmitting the second request to access the second user electronic health record data;
storing, by the one or more processors, the second user electronic health record data of the second user in one or more second data structures managed by the data management system;
receiving, by the one or more processors, a second request from the one or more servers of the provider portal to access portions of the user electronic health record data; and
transmitting, by the one or more processors, responsive to second request from the one or more servers of the second provider portal, the portions of the second user electronic health record data of the second user to the one or more servers of the second provider portal in accordance with one or more types of data defined at registration of the second provider portal with the data management system such that the data management system restricts transmission of a remaining portion of the user electronic health record data stored in the one or more data structures managed by the data management system.

15. The method of claim 11, further comprising: transmitting, by the one or more processors, responsive to a subsequent data request from the one or more servers of the provider portal, a third portion of the user electronic health record data of the user to the provider in accordance with one or more types of data defined at registration of the provider portal.

16. The method of claim 11, further comprising: receiving, by the one or more processors, the data management system credentials from the client device, the data management system credentials including a client identifier and a password corresponding to the client device.

17. The method of claim 11, further comprising: transmitting, by the one or more processors, responsive to the request from the one or more servers of the provider portal, the portion of the user data of the user to the client device in accordance with one or more types of data defined at registration of the provider portal.

18. The method of claim 11, further comprising: storing, by the one or more processors, consent data about the user data in one or more data structures managed by the data management system based on a partner identifier, the consent data indicating that the data management system is configured to transmit data to the one or more servers of the provider portal.

19. The method of claim 18, further comprising: providing, by the one or more processors, a user interface to the user of the client device, and responsive to an interaction with the user interface to revoke consent to share the user data of the user with the provider portal, update the one or more data structures managed by the data management system to restrict the data management system from sharing the user data with the provider portal.

20. The method of claim 11, wherein the actionable object presented within the information resource of the provider portal is presented via a software development kit (SDK) of the data management system.

\* \* \* \* \*